(12) United States Patent
Dijkmans

(10) Patent No.: US 6,272,182 B1
(45) Date of Patent: *Aug. 7, 2001

(54) DIGITAL TRANSMISSION SYSTEM FOR TRANSMITTING A DIGITAL AUDIO SIGNAL BEING IN THE FORM OF SAMPLES OF A SPECIFIC WORDLENGTH AND OCCURRING AT A SPECIFIC SAMPLING RATE

(75) Inventor: Eise C. Dijkmans, Eindhoven (NL)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/754,660

(22) Filed: Nov. 21, 1996

(30) Foreign Application Priority Data

Nov. 21, 1995 (EP) .................................... 95203196

(51) Int. Cl.$^7$ .................................... H04L 27/00
(52) U.S. Cl. .......................... 375/259; 704/205
(58) Field of Search .................. 375/247, 242, 375/240, 241, 244, 260, 259, 355; 704/254, 229, 200, 201, 205, 500, 501, 504; 341/126, 143, 144; 370/477

(56) References Cited

U.S. PATENT DOCUMENTS

| 5,225,787 | * | 7/1993 | Therssen | 328/15 |
| 5,323,396 | * | 6/1994 | Lokhoff | 370/94.1 |
| 5,627,536 | * | 5/1997 | Ramirez | 341/141 |
| 5,719,571 | * | 2/1998 | Akune et al. | 341/61 |

FOREIGN PATENT DOCUMENTS 0402973  12/1990 (EP) .

OTHER PUBLICATIONS

W.H. Fletcher and S.C. Wegerif, "A Single Chip Solution For Interfacing Digital Audio in Broadcast Applicationts", International Broadcasting Convention, pp. 217–222, 1990.*

R.W. Stewart, "An Overview of Sigma Delta ADCs and DAC Devices", IEE Colloquim on Oversampling and Sigma–Delta Strategies for DSP, pp. 1–9, 1995.*

* cited by examiner

Primary Examiner—Don N Vo
(74) Attorney, Agent, or Firm—Michael E. Belk

(57) ABSTRACT

A digital transmission system having a transmitter and a receiver for transmitting and receiving a digital audio signal. The digital audio signal is in the form of samples of a specific wordlength and occurring at a specific sampling rate. The transmitter includes an input terminal for receiving the digital audio signal and for receiving a first information word having a relationship with the specific wordlength and a second information word having a relationship with the specific sampling rate. The transmitter also includes a formatting unit for combining the digital audio signal and the first and second information words into a serial datastream suitable for transmission via a transmission medium. The wordlength of the samples in the digital audio signal, expressed in number of bits, is equal to n, where n is an integer larger than zero, and the sampling rate is equal to $2^p.F_s$, where p is an integer larger than zero and $F_s$ is equal to a frequency value taken from a group of at least two frequency values, with the group of frequency values including 44.1 kHz and 48 kHz.

The receiver includes a sample rate converter for converting the sampling rate of the signal.

13 Claims, 2 Drawing Sheets

US 6,272,182 B1

DIGITAL TRANSMISSION SYSTEM FOR TRANSMITTING A DIGITAL AUDIO SIGNAL BEING IN THE FORM OF SAMPLES OF A SPECIFIC WORDLENGTH AND OCCURRING AT A SPECIFIC SAMPLING RATE

BACKGROUND OF THE INVENTION

1. Field of the Invention

The invention relates to a digital transmission system having a transmitter and a receiver for transmitting and receiving a digital audio signal, the digital audio signal being in the form of digital samples having a specific wordlength and occurring at a specific sampling rate. The invention further relates to a transmitter for use in the transmission system, a receiver for use in the transmission system, to a record carrier obtained with the transmitter and to a transmission signal.

2. Description of the Related Art

A transmission system as defined in the opening paragraph is known from U.S. Pat. No. 5,323,396.

The transmitter therein includes a subband encoder which splits a wideband digital audio signal into a plurality of subband signals, carries out a quantization on the subband signals based on a psychoacoustic masking model so as to obtain a data reduction of the amount of audio information to be transmitted. Subsequently, the quantized subband signals are combined into a composite transmission signal so as to enable transmission. Together with the data reduced audio information, an information word relating to the sampling frequency of the wideband digital audio signal is also transmitted in order to regenerate the wideband digital audio signal with the same sampling frequency upon reception.

SUMMARY OF THE INVENTION

The invention aims at providing a transmission system as per the opening paragraph which is capable of processing and transmitting audio signals having a wide range of sampling frequencies and wordlengths of the samples of the wideband digital audio signal.

It is a further object of the invention to enable the reception of the transmitted audio signals, with the possibility to convert the sampling frequencies of such audio signals to a desired sampling frequency in a receiver.

The transmission system in accordance with the invention has a transmitter and a receiver for transmitting and receiving a digital audio signal, the digital audio signal being in the form of digital samples having a specific wordlength and occurring at a specific sampling rate, the transmitter comprising input means for receiving the digital audio signal and for also receiving a first information word having a relationship with the specific wordlength and a second information word having a relationship with the specific sampling rate, formatting means for combining the digital audio signal and the first and second information words into a serial datastream suitable for transmission via a transmission medium, the wordlength of the samples in the digital audio signal, expressed in number of bits, being equal to n, where n is an integer larger than zero, and the sampling rate being equal to $2^p.F_s$, where p is an integer larger than zero and $F_s$ is equal to a frequency value taken from a group of at least two frequency values, said group of frequency values including 44.1 kHz and 48 kHz.

It is a further object of the invention to carry out a data compression step on the digital audio signal which is not based on a subband coder data compression step. Preferably, the data compression step is a lossless data compression step, such as a variable length coding, a Huffman coding, an arithmetic encoding or a Lempel-Ziv encoding. Such data compression steps are much simpler to realize, compared to the subband coding algorithm known from the prior art.

BRIEF DESCRIPTION OF THE DRAWING

These and other aspects of the invention will become apparent from and elucidated further with reference to the embodiments described in the following drawings, in which.

DESCRIPTION OF THE PREFERRED EMBODIMENTS

Figure 1:
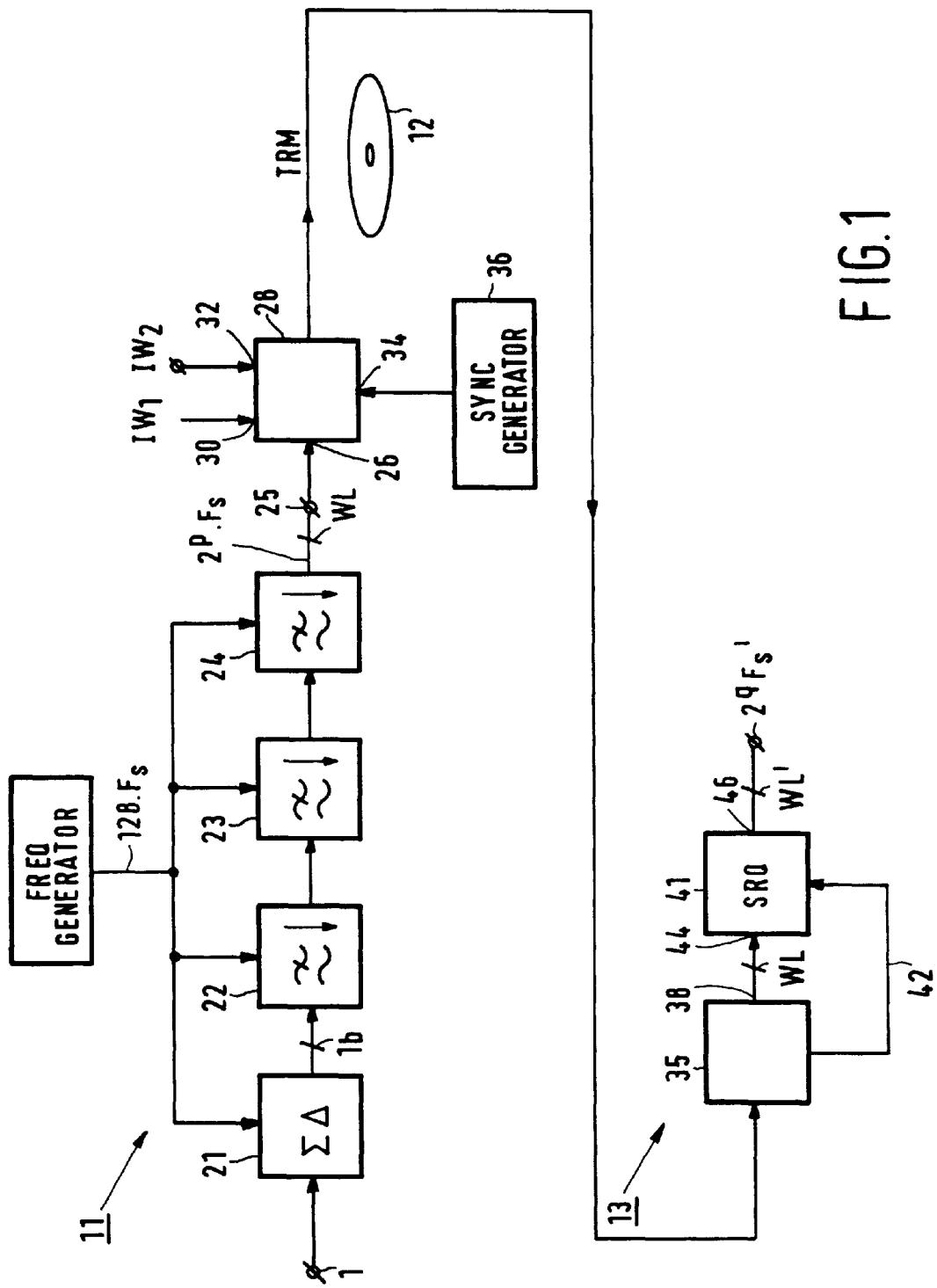
FIG. 1 shows the transmission system in accordance with the invention.

FIG. 1 shows a digital transmission system in accordance with the invention, comprising a transmitter 11 for transmitting a digital audio signal via a transmission medium TRM, such as a information carrier 12, to a receiver 13. An analog audio signal is supplied to an input terminal 1 of the transmitter 11, which input terminal 1 is coupled to an input of a sigma-delta modulator 21. Under the influence of a very high sampling frequency of $N.F_s$, where $F_s$ equals 48 kHz or 44.1 kHz, or in exceptional cases 32 kHz, and where N could be chosen equal to 128, the sigma-delat modulator 21 converts the analog audio signal into samples with a limited wordlength ranging from 6, as an example, to preferably 1 bit. In the further description it will be assumed that the sigma delta modulator 21 generates a 1-bit bitstream signal. Converting an analog audio signal into a 1-bit bitstream signal has a number of advantages. Bitstream conversion is a high quality encoding method, with the possibility of a high quality decoding or a low quality decoding using a simpler decoding circuit. Reference is made in this respect to the publications 'A Digital Decimating Filter for Analog-to-Digital Conversion of Hi-Fi Audio signals', by J. J. van der Kam, Philips Techn Rev. 42, No. 6/7, Apr. 1986, pp. 230–8, and 'A Higher Order Topology for Interpolative Modulators for Oversampling A/D Converters', by Kirk C. H. Chao et al, IEEE Trans on Circuits and Systems Vol. 37, No. 3, March 1990, pp. 309–19.

The bitstream signal is supplied to at least one lowpass filter and down sampler unit. In the embodiment of FIG. 1, a series arrangement of three lowpass filter and down sampler units 22, 23 and 24 are present, all clocked with the $128.F_s$ clock frequency, or derivations thereof. The lowpass filter and down sampler unit 22 comprise a lowpass filter that filters out the lowest ⅛-th part of the frequency band of interest of the bitstream signal, which is $64.F_s$ Hz, to a bandwidth of $8.F_s$ Hz and down samples the bitstream signal by a factor of 8, so as to obtain an output signal with a sampling rate of $16.F_s$. The lowpass filter and down sampler unit 23 in the same way comprise a lowpass filter that halves the frequency band of interest of the output signal of the unit 22, which is now $8.F_s$ Hz, to a bandwidth of $4.F_s$ Hz and down samples this signal by a factor of 2, so as to obtain an output signal with half the sampling rate of $8.F_s$. The lowpass filter and down sampler unit 24 in the same way comprise a lowpass filter that halves the frequency band of interest of the output signal of the unit 23, which is now $4.F_s$ Hz, to a bandwidth of $2.F_s$ Hz and down samples this signal by a factor of 2, so as to obtain an output signal with half the sampling rate of $4.F_s$.

Thus, at the Output of the unit 24, a digital audio signal is available having a sampling rate of $4.F_s$ and a wordlength, expressed in number of bits, equal to WL. This wordlength WL can have any value, dependent of the accuracy of calculation in the units 22, 23 and 24. As an example, WL could be equal to 24.

It should thus be noted that the digital audio signal present at the terminal 25 has a wordlength and a sampling rate, which is dependent on the choice made by the provider of the digital audio signal. The provider may prefer the value 44.1 kHz to be chosen for $F_s$. Other providers of audio software may prefer 48 kHz to be chosen for $F_s$. Further, a provider may choose more or less lowpass filter and down sampler units to be used in order to derive the digital audio signal from the bitstream signal present at the output of the converter 21. It should however be noted that, in accordance with the invention, the sampling rate of the digital audio signal applied to the terminal 25 has a sampling rate which equals $2^p.F_s$, where p is an integer larger than zero and $F_s$ is equal to a frequency value taken from a group of at least two frequency values, said group of frequency values including 44.1 kHz and 48 kHz. In exceptional circumstances, $F_s$ may be chosen equal to 32 kHz.

The digital audio signal present at the terminal 25 is supplied to an input 26 of a signal combination unit 28. The combination unit 28 has further inputs 30, 32 and 34 for receiving a first information word $IW_1$, a second information word $IW_2$ and a sync word, respectively. The first information word is representative of the wordlength WL with which the samples of the digital audio signal are supplied to the input 26 and the second information word is representative of the sampling rate, in the above example $4.F_s$, of the digital audio signal supplied at the input 26.

Sync words are supplied to the input 34 by a sync word generator 36. The combination unit 28 combines the information words $IW_1$ and $IW_2$ and the samples of the digital audio signal supplied to the input 26 into a composite signal. Sync words are added to the composite signal and, where necessary, an error correction encoding step and a channel encoding step are applied to the composite signal so as to obtain a transmission signal in the form of a serial datastream, suitable for transmission via the transmission medium TRM (the disk 12).

The combination of the various input signals of the combination unit 28 into a composite signal can be realized by generating blocks of samples comprising a sync word and a plurality of samples, where the information words are stored in each block of samples. An error correction encoding step and a channel encoding step may be carried out on the samples only, or on the samples including the information words in a block.

Further, prior to error correction encoding and/or channel encoding, a substantially lossless data compression step could be carried out on the samples of the digital audio signal applied to the input 26. Lossless coders have the advantage that they can data compress the audio signal in such a way that, after data expansion by a lossless decoder, the original residual bitstream signal can be reconstructed in a substantially lossless way. That means that there is substantially no loss of information after compression-expansion. Lossless oders can be in the form of a variable length coder. Variable length coders are well known in the art. Examples of such variable length coders are Huffman coders, arithmetic coders and Lempel-Ziv coders. Reference is made in this respect to the publications 'A Method for the Construction of Minimum-Redundancy Codes' by D. A. Huffman, Proc. of IRE, vol. 40(10) September 1952, 'An Introduction to Arithmetic Coding' by G. G. Langdon, IBM J. Res. Develop., Vol. 28(2), March 1984, and 'A Universal Algorithm for Sequential Data compression'by J. Ziv et al, IEEE Trans. on Inform. Theory, Vol. IT-23, 1997.

The transmission medium TRM can be a RF link, or a record carrier, such as an optical disk or a magnetic record carrier, or even a solid state memory.

Via the transmission medium TRM, the transmission signal is supplied to the receiver 13. The receiver comprises a detector unit 35 for retrieval of the transmission signal from the transmission medium TRM. The receiver 13 further comprises a sample rate converter 41, well known in the art. Reference is made in this respect to U.S. Pat. No. 5,225,787.

The detector unit 35 is adapted to retrieve the first and second information words from the serial datastream and to retrieve the digital audio signal from the serial datastream using the first information word. As a result, samples of the digital audio signal having the wordlength WL are supplied at the output 38 with a sampling rate substantially equal to $2^p.F_s$, which is in the present example $4.F_s$. The second information word, representative of the sampling frequency of the digital audio signal is supplied via the line 42 to the sample rate converter 41 to control the conversion in the sample rate converter 41.

The sample rate converter 41 is adapted to convert the sampling rate of the samples in the digital audio signal supplied to its input 44 from the sampling rate defined by the second information word $IW_2$ into a second sampling rate so as to obtain a sample rate converted digital audio signal, which is supplied to an Output 46. The second sampling rate is equal to $2^q.F_s'$, where q is an integer larger than zero and $F_s'$ is equal to a frequency value taken from a group of at least two frequency values, said group of frequency values including 44.1 kHz and 48 kHz. In exceptional cases $F_s'$ can be chosen equal to 32 kHz. Preferably, $F_s'$ is 48 kHz, as sample rate conversion from a lower frequency $F_s$ (e.g. equal to 44.1 kHz) to a higher frequency $F_s'$ can be realized in a simpler way, with simpler filters. The wordlength WL' of the samples supplied at the output 46 need not be the same as the wordlength WL of the samples of the digital signal received.

Figure 2:
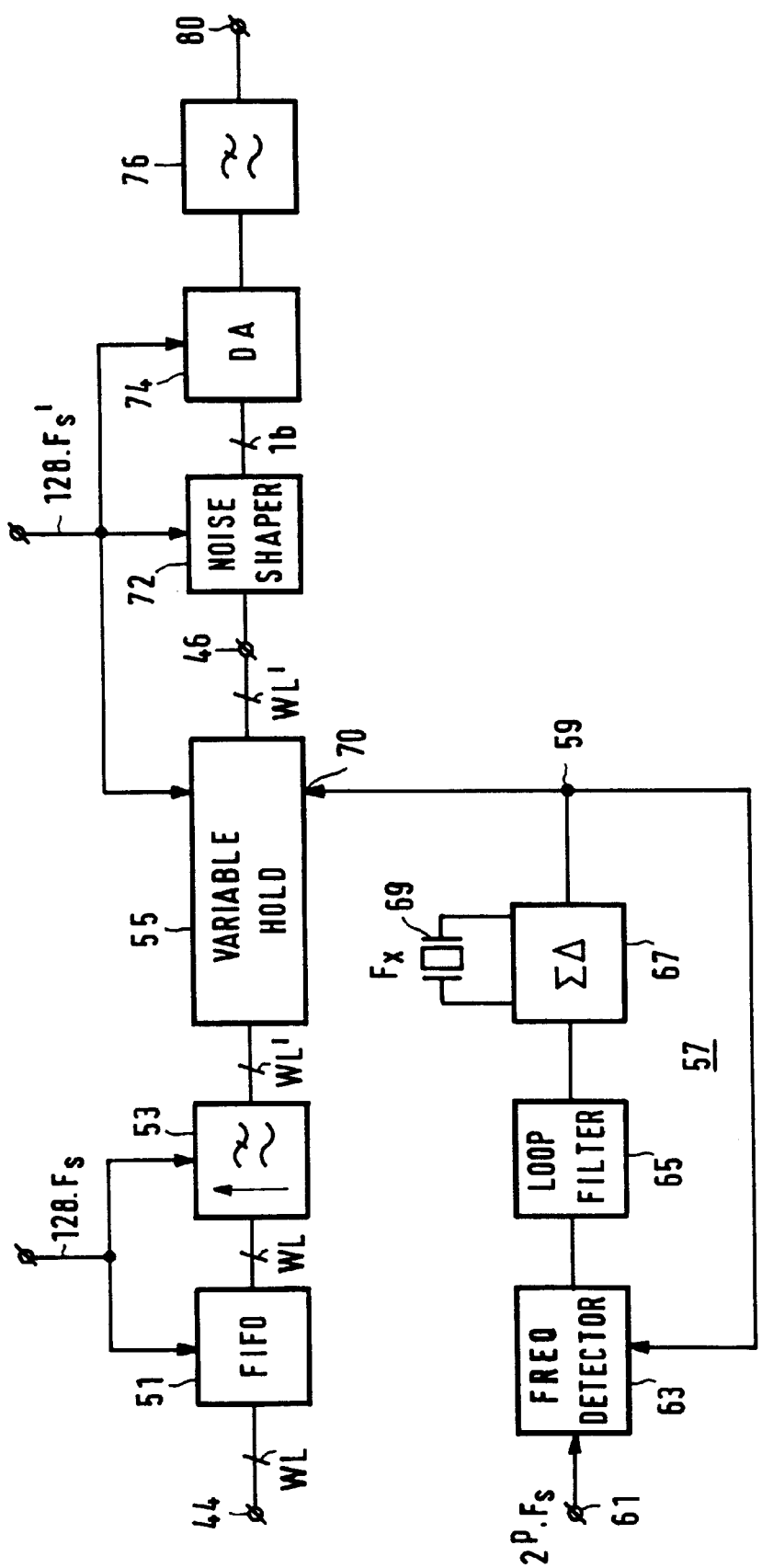
FIG. 2 shows a further elaboration of part of the receiver in the system.

FIG. 2 shows a further elaborated version of the sample rate converter 41. The converter 41 comprises a first-in-first out shiftregister 51, an upsampling filter unit 53 and a variable hold circuit 55. Further, a control signal generator 57 is present for generating a control signal at an output 59 to control the variable hold circuit 55. The receiver comprises a frequency generator (not shown) that generates a clock frequency $128.F_s$, in response to the information word $IW_2$ received, to control the FIFO 51 and the upsampling filter 53. Further, this frequency generator generates the frequency $2^p.F_s$ which is supplied to an input 61 of the control signal generator 57, which has the form of a digital control loop. The loop 57 comprises a frequency detector 63, a loop filter 65 and a sigma delta modulator 67.

The samples of the digital audio signal retrieved from the transmission signal by the detector 35 are supplied to the input of the FIFO 51. The FIFO 51 is required in order to account for variations in the rate with which the samples are retrieved from the transmission medium and supplied by the detector 35 so as to obtain a datastream of samples at the output of the FIFO 51 having a sampling rate of $2^p.F_s$, which in the present example equals $4.F_s$. The upsampling filter 53 upsamples the digital audio signal, e.g. to a sampling rate of $64.F_s$. The wordlength WL' of the samples at the output of the filter 53 may be larger than the wordlength WL.

The upsampled digital audio signal is supplied to the input of the variable hold circuit 55, which supplies output samples at a rate $2^q.F_s'$, in response to the control signal applied to the control signal input 70. In response to the control signal, it is decided whether the next output sample is obtained by taking over a new input sample or by repeating the previous output sample.

The variable hold circuit 55 function under the influence of a clock signal, e.g. $128.F_s'$, internally generated by the receiver.

The conversion process in the variable hold circuit 55 is controlled by the sigma delta modulator 67 in the control loop 57, which is clocked by a crystal oscillator 69 having a oscillation frequency $F_x$. The Output signal of the sigma delta modulator 67 is in the form of '+1' and '−1' pulses and is a pulse density modulated version of its input signal. If for instance, the input signal has a DC value of 0.5, then the sigma delta modulator 67 will generate three '+1' pulses and one '−1' pulse, so that on the average $\{3.(+1)+1.(-1)\}/4 =0.5$.

If the clock frequency of the sigma delta modulator 67 is $F_x$, it will generate $F_x$ pulses in one second. Suppose now that this clock frequency is chosen to be the same as the output sampling frequency of the sampling rate converter, then the output pulses of the sigma delta modulator 67 can be used to control the conversion process. The input signal of the sigma delta modulator 67 is a DC value which is dependent of the input and output sampling frequencies of the sampling rate converter. The variable hold circuit 55 is controlled in such a way by means of the pulses supplied by the sigma delta modulator 67 that a '+1' pulse means that the previous output sample is repeated and that a '−1' pulse means that a new input sample is taken over.

Every second, $64.F_s$ input samples must be converted into $2q.F_s'$ output samples ($2^q$ will generally be chosen equal to 64 as well, in the present example). When the input sampling frequency of the sample rate converter is smaller than the output sampling frequency of the converter, all input samples of the hold circuit will be used at its output so as to generate the output signal of the hold circuit 55. This means that the sigma delta modulator 67 has to generate $64.F_s$'−1' pulses in 1 second. The remaining $2^q.F_s'-64.F_s$ output samples are obtained by repeating some of the input samples, such as by holding the previous output sample. Therefore, the sigma delta modulator 67 has to generate $2^q.F_s'-64.F_s$'+1' pulses in one second.

The receiver may further comprise a noise shaper 72, followed by a DA converter 74 and a lowpass filter 76. The noise shaper 72 and the DA converter 74 also function under the influence of the frequency $128.F_s'$. The noise shaper converts the digital signal applied to its input into a 1-bit bitstream signal having a sampling frequency of $64.F_s'$, which is subsequently DA converted in the converter 74 and filtered in the filter 76 in order to obtain an analog audio signal at the output 80 with a bandwidth of 20 kHz, as an example.

The transmission system as described in the foregoing has the advantage that audio signals of various wordlengths WL and sampling rates, related to $F_s$, can be transmitted via the transmission medium, with the possibility of receiving those signals and converting them to a fixed frequency, related to $F_s'$.

Whilst the invention has been described with reference to preferred embodiments thereof, it is to be understood that these are not limitative examples. Thus, various modifications may become apparent to those skilled in the art, without departing from the scope of the invention, as defined in the claims. Further, the invention lies in each and every novel feature or combination of features.

What is claimed is:

1. A digital transmission system comprising a transmitter including:
   transmitter input means for receiving samples of a digital audio signal and for receiving a first information word indicating a specific wordlength of the samples and a second information word indicating a specific sampling rate of the samples; and
   formatting means for combining the samples and the first and second information words into a serial datastream, the wordlength of the samples expressed in a number of bits, being equal to n, where n is an integer larger than zero, and the sampling rate equal to $2^p*F_s$, where p is an integer larger than zero and $F_s$ is a frequency value selected from a group of frequency values consisting of: 32 kHz, 44.1 kHz and 48 kHz; and
   means for transmitting the serial datastream through a medium;
   receiver input means for receiving the serial datastream from the transmission medium;
   retrieval means for retrieving the first and second information words from the serial datastream, and for retrieving the samples of the digital audio signal from the serial datastream using the first information word;
   sample rate conversion means for converting the sampling rate of the samples from the sampling rate defined by the second information word into a second sampling rate so as to obtain an sample rate converted digital audio signal, wherein the second sampling rate is equal to $2^{q}*F_s'$, where q is an integer larger than zero and $F_s'$ is a frequency value selected from a group of frequency values consisting of: 32 kHz, 44.1 kHz and 48 kHz, the samples in the sample rate converted digital audio signal having a specific wordlength: the sample rate conversion means including:
   upsampling means for upsampling the samples of the digital audio signal so as to obtain an upsampled digital audio signal having a sampling rate equal to $2^{q}*F_s'$; and
   variable hold means for variably holding samples of the upsampled digital audio signal so as to obtain the sample rate converted digital audio signal; and
   the receiver further including, output means for supplying the sample rate converted digital audio signal at the second sampling rate.

2. The system of claim 1, wherein $F_s$ is a frequency value selected from a group of frequency values consisting of: 44.1 kHz and 48 kHz.

3. The system of claim 1, wherein the formatting means includes channel encoding means for channel encoding at least the digital audio signal so as to obtain the serial datastream.

4. The system of claim 1, wherein the formatting means includes error correction encoding means for error correction encoding at least the samples of the digital audio signal so as to obtain the serial datastream.

5. The system of claim 1, wherein:
   the transmitter further includes a sigma-delta modulator and at least one lowpass filter and down sampler unit, the sigma-delta modulator being adapted to receive an analog audio signal and for supplying a 1-bit bitstream audio signal in response thereto; and the at least one lowpass filter and down sampler unit being adapted to down sample the 1-bit bitstream signal so as to obtain the samples of the digital audio signal, and for supplying the samples of the digital audio signal to the transmitter input means.

6. The system of claim 5, wherein the lowpass filter and downsampler unit provides the samples with a factor $2^r$, where r is an integer larger than zero.

7. The system of claim 1, wherein $F_s'$ equals 48 kHz.

8. The system of claim 1, wherein the receiver further includes D/A conversion means for converting the in sample rate converted digital audio signal into an analog audio signal.

9. The system of claim 1, wherein the receiver input means include channel decoding means for channel decoding the serial datastream.

10. The system of claim 1, wherein the receiver input means include error correction means for carrying out an error correction step on a signal applied to the input of the error correction means.

11. The system of claim 1, wherein:

the transmitter further comprises lossless compression means for carrying out a substantially lossless data compression step on the samples of the digital audio signal so as to obtain a data compressed digital audio signal for transmission via the transmission medium; and the receiver further comprising lossless expansion means for carrying out a data expansion step on the data compressed digital audio signal in the transmission signal so as to obtain a replica of the samples of the digital audio signal.

12. A method comprising the steps of:

receiving samples of a digital audio signal;

receiving a first information word indicating the specific wordlength of the samples and a second information word indicating the specific sampling rate of the samples;

combining the samples and the first and second information words into a serial datastream, the wordlength of the samples, expressed in a number of bits, being equal to n, where n is an integer larger than zero, and the sampling rate of the samples being equal to $2^p*F_s$, where p is an integer larger than zero and $F_s$ is a frequency value selected from a group of frequency values consisting of: 32 kHz, 44.1 kHz and 48 kHz;

transmitting the serial datastream through a medium;

receiving the serial datastream from the medium;

retrieving the first and second information words from the serial datastream, and retrieving the samples of the digital audio signal from the serial datastream using the first information word;

converting the sampling rate of the samples from the sampling rate defined by the second information word into a second sampling rate so as to obtain an sample rate converted digital audio signal, wherein the second sampling rate is equal to $2^{q}*F_s'$, where q is an integer larger than zero and $F_s'$ is a frequency value selected from a group of frequency values consisting of: 32 kHz, 44.1 kHz and 48 kHz, the samples in the sample rate converted digital audio signal having a specific wordlength; the sample rate conversion including:

upsampling the samples of the digital audio signal so as to obtain an unsampled digital audio signal having a sampling rate equal to $2^{q}*F_s'$; and variably holding samples of the upsampled digital audio signal so as to obtain the sample rate converted digital audio signal; and the method further comprising supplying the sample rate converted digital audio signal at the second sampling rate.

13. A receiver comprising:

receiver input means for receiving a serial datastream from a transmission medium;

retrieval means for retrieving a first and second information words from the serial datastream, for retrieving a digital audio signal from the serial datastream using the first information word;

sample rate conversion means for converting the sampling rate of the samples in the digital audio signal supplied by the retrieval means from the sampling rate defined by the second information word into a second sampling rate so as to obtain an in sample rate converted digital audio signal, wherein the second sampling rate is equal to $2^{q}*F_s'$, where q is an integer larger than zero and $F_s'$ is a frequency value selected from a group of frequency values consisting of: 32 kHz, 44.1 kHz and 48 kHz, the samples in the in sample rate converted digital audio signal having a specific wordlength; and output means for supplying the in sample rate converted digital audio signal at the second sampling rate;

and wherein the sample rate conversion means include:

upsampling means for upsampling the digital audio signal so as to obtain an upsampled digital audio signal having a sampling rate equal to $2^{q}*F_s$; and variable hold means for variably holding the samples of the upsampled digital audio signal so as to obtain the in sample rate converted digital audio signal.

* * * * *